J. PARR.
RATCHET-MOVEMENT.
No. 169,574.  Patented Nov. 2, 1875.
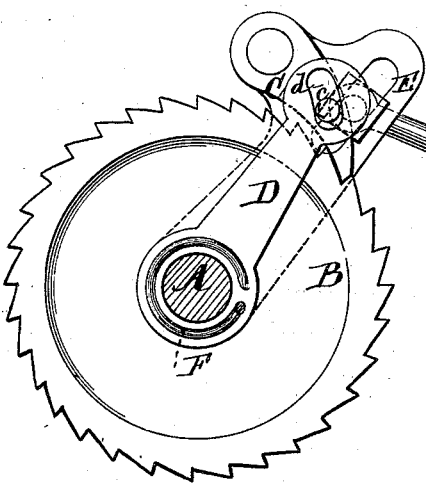
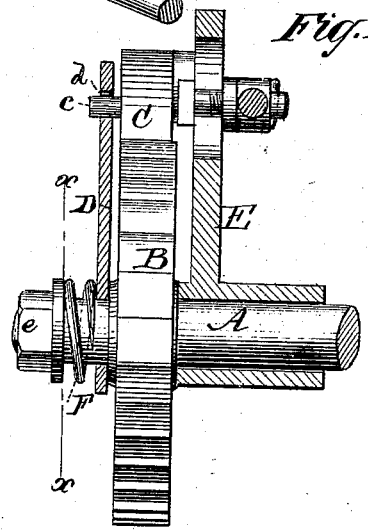
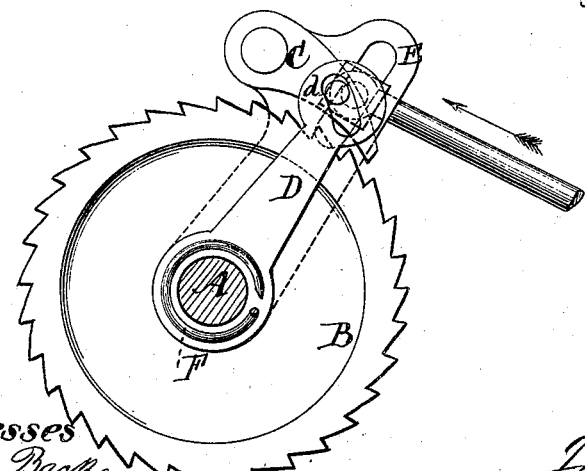
Witnesses
John Becker
Fred Haynes
Joseph Parr
by his Attorneys
Brown & Allen

UNITED STATES PATENT OFFICE.

JOSEPH PARR, OF NEW YORK, N. Y., ASSIGNOR TO LYDIA ANN McCOLLUM, SOLE EXECUTRIX AND TRUSTEE OF THE ESTATE OF JOHN McCOLLUM, DECEASED.

IMPROVEMENT IN RATCHET-MOVEMENTS.

Specification forming part of Letters Patent No. 169,574, dated November 2, 1875; application filed September 28, 1875.

*To all whom it may concern:*

Be it known that I, JOSEPH PARR, of New York, in the county and State of New York, have invented an Improved Ratchet-Movement; and I do hereby declare that the following is a full, clear, and exact description of the same.

The main object of my invention is to prevent the rattling or clicking noise incident to the backward motion of a pawl upon a ratchet, and also to prevent the wear resulting from such motion.

The invention consists in the combination, with the pawl and ratchet-shaft, of a device of novel construction, whereby the pawl is lifted from and held clear of the ratchet-teeth during its backward movement, and caused to drop into gear with the teeth before the commencement and during the continuance of the forward movement.

The accompanying drawing illustrates one mode of carrying out my invention.

Figure 1 is a partly-sectional view parallel with the axis of the ratchet. Fig. 2 is a side sectional view taken in the line $x$ $x$ of Fig. 1, showing the pawl at the end of its forward movement. Fig. 3 is a similar view, showing the pawl raised for the backward movement.

The invention is here represented as applied to a pawl-and-ratchet mechanism for giving an intermittent rotary motion to a shaft or roller. The ratchet B is attached to the shaft A in any suitable manner. The pawl C is of any suitable construction, with its carrying-arm E working loosely on the shaft A. The pawl is connected with the main driving-power in any suitable manner. On the shaft A is an arm, D, through which the shaft passes freely, and which may be arranged on either side of the ratchet B, but is here represented as arranged between the outer side of the ratchet and the extreme outer end of the shaft, on which is a nut, $e$. Between the arm D and the nut $e$ is a spring, F.

When the arm is arranged on the opposite side of the ratchet the spring may be placed between the arm and the sleeve of the pawl-carrying arm E.

In the upper portion of the arm D is a slot, $d$, inclined upward transversely of the length of the arm. From one side of the pawl C a pin, $c$, extends, and works in the inclined slot $d$.

Instead of the slot the upper portion of the arm may be beveled, so as to form an inclined surface, or the arm D may be provided with a pin or projection working in a groove or recess in the pawl, or against the under surface thereof.

The pressure of the spring F against the arm D is just strong enough to cause said arm to bear against the side of the ratchet sufficiently hard to prevent it from being moved by the mere friction of the pin in the slot or against the inclined surface, but allow it to move parallel and simultaneously with the pawl-carrying arm E when the pin arrives at either end of said slot or inclined surface.

When the pawl is about to move forward the pin $c$ slides freely in the slot $d$, and allows the point of the pawl to drop into gear with the ratchet, as shown in Fig. 2, and continue in gear during the continuance of the forward movement. As soon as the pawl becomes engaged with the ratchet the pin $c$ assumes such a position in the slot $d$ as to cause the arm D to move forward parallel and simultaneously with the pawl-carrying arm E.

When the pawl begins its backward movement the pin $c$ slides freely up the inclined surface until the point of the pawl is raised, as shown in Fig. 3, so as to clear the teeth, whereupon the pin $c$, in its tendency to move in an arc of a circle, bears against the upper portion of the inclined surface or slot $d$, and carries the arm D backward parallel and simultaneously with the pawl-carrying arm E.

Instead of the slot shown herein, there may be simply an inclined surface with shoulders or projections for the pin to work between.

The arm D may be pressed against the ratchet by any suitable spring or equivalent device which will accomplish the result above described.

By means of this invention the pawl is enabled to move noiselessly, and is prevented from becoming worn by friction against the teeth.

What I claim as new, and desire to secure by Letters Patent, is—

The combination, with a pawl, ratchet, and ratchet-shaft, of an arm, D, having an inclined slot, d, engaging with a projection on the pawl, and provided with a spring, F, for holding it in contact with the ratchet, as herein described, whereby the pawl is held clear of the ratchet during the backward movement, and thrown into gear during the forward movement, substantially as shown and set forth.

JOSEPH PARR.

Witnesses:
 BENJAMIN W. HOFFMAN,
 FRED. HAYNES.